United States Patent
Tanaka et al.

(10) Patent No.: US 7,021,062 B2
(45) Date of Patent: Apr. 4, 2006

(54) FUEL CONTROL METHOD AND APPARATUS FOR COMBINED PLANT

(75) Inventors: Satoshi Tanaka, Hyogo (JP); Kimiya Kagotani, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 114 days.

(21) Appl. No.: 10/624,572

(22) Filed: Jul. 23, 2003

(65) Prior Publication Data

US 2004/0159105 A1 Aug. 19, 2004

(30) Foreign Application Priority Data

Jul. 30, 2002 (JP) .............................. 2002-222115

(51) Int. Cl.
*F02C 6/18* (2006.01)
*F02C 9/28* (2006.01)

(52) U.S. Cl. .................... 60/773; 60/39.182; 60/39.281

(58) Field of Classification Search ................. 60/773, 60/39.181, 39.182, 39.183, 39.281; 700/287
See application file for complete search history.

(56) References Cited

U.S. PATENT DOCUMENTS

| 5,148,668 | A | 9/1992 | Frutschi |
| 6,035,629 | A | 3/2000 | Hilgeman et al. |
| 2001/0004830 | A1* | 6/2001 | Wakana et al. ........... 60/39.182 |
| 2003/0014962 | A1* | 1/2003 | Tanaka et al. ........... 60/39.182 |
| 2004/0011040 | A1* | 1/2004 | Tanaka et al. ................. 60/698 |

FOREIGN PATENT DOCUMENTS

| DE | 44 26 354 A1 | 2/1996 |
| JP | 2000-356112 | 12/2000 |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

In a fuel control method for a combined plant, when the combined plant is just started or during a rated operation, a clutch is completely disengaged or engaged, and therefore, fuel is controlled in the same manner as in the prior art. In the meantime, before and after the clutch is engaged or disengaged, a target load set value is switched to an actual load in response to a signal from a clutch engagement or disengagement period detection unit as a trigger. In this manner, a sudden change in load that may occur when the clutch is engaged or disengaged never influences on a control system disposed downstream thereof.

2 Claims, 8 Drawing Sheets

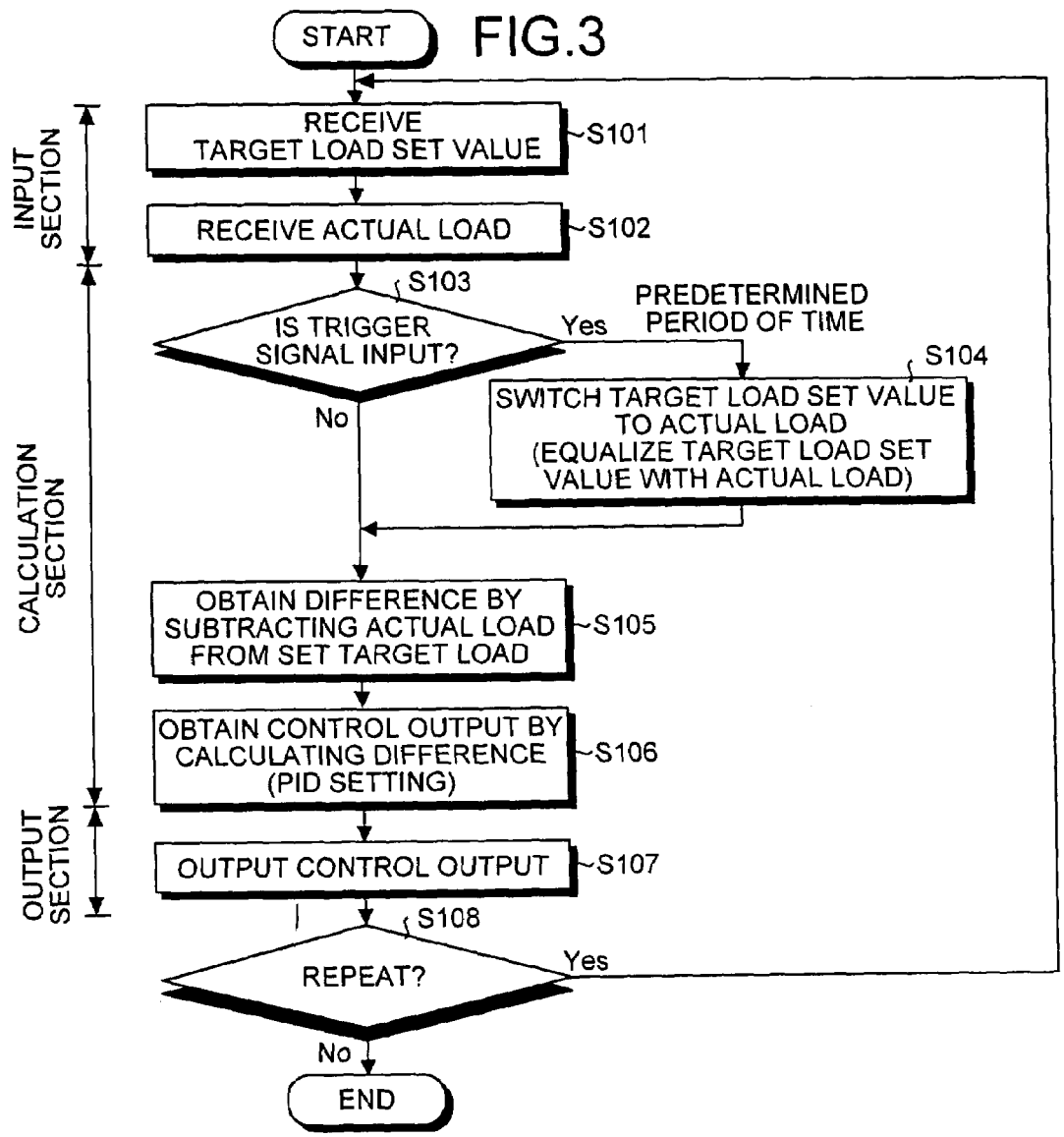
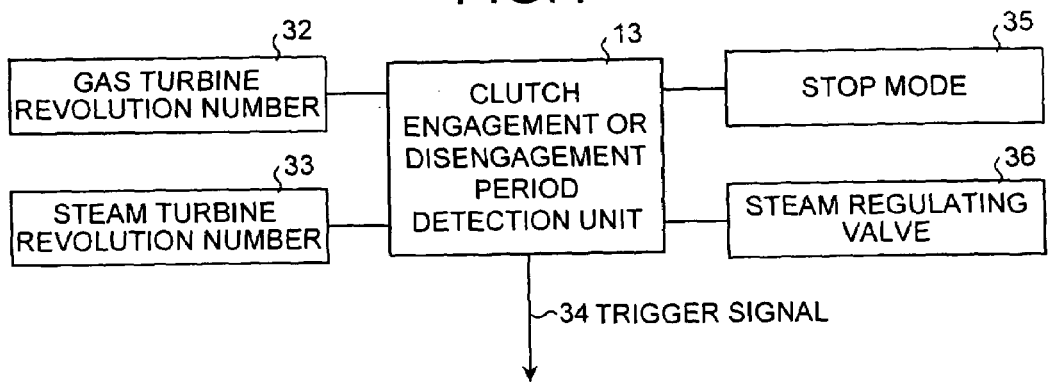

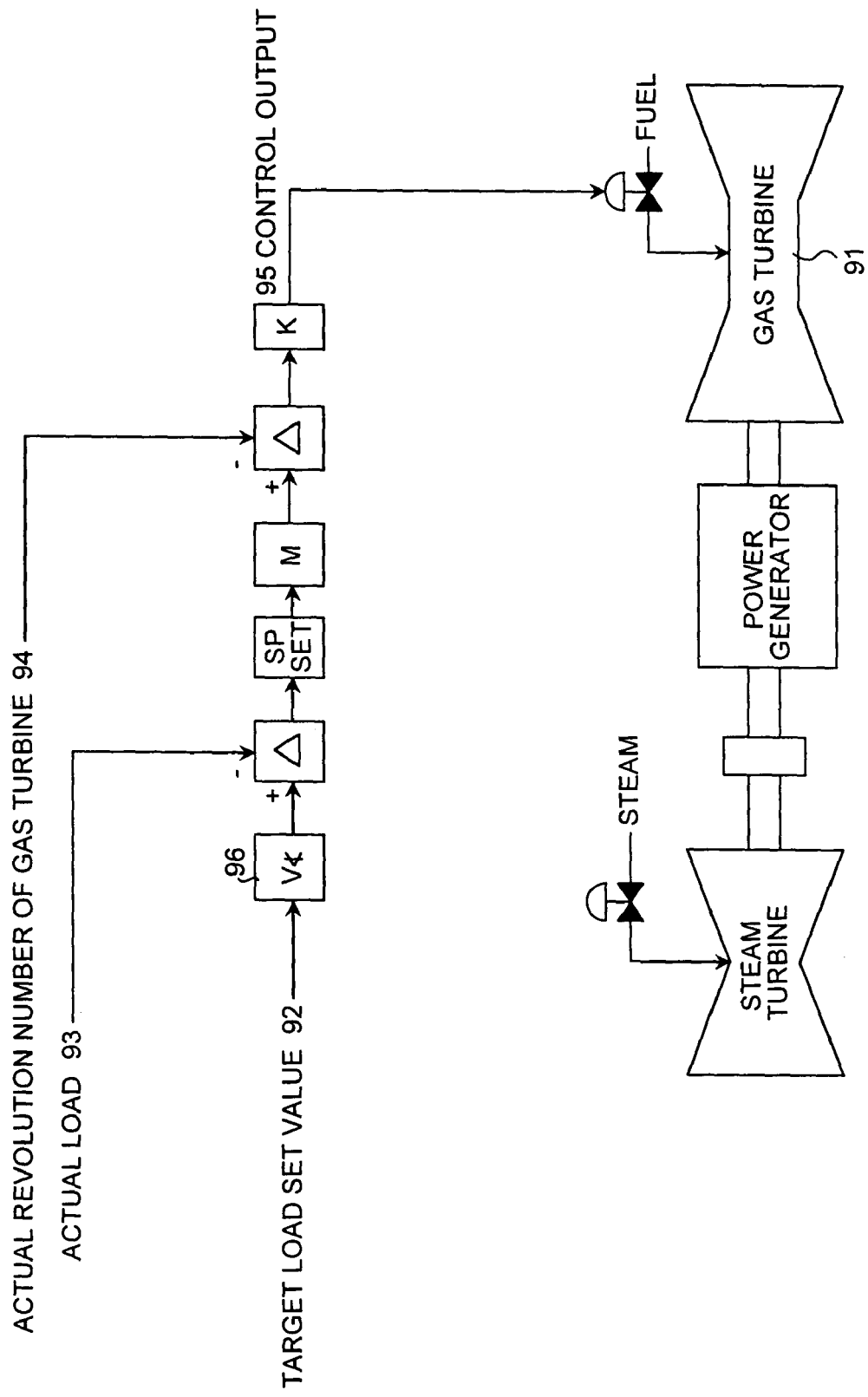

FUEL CONTROL METHOD AND APPARATUS FOR COMBINED PLANT

BACKGROUND OF THE INVENTION

1) Field of the Invention

The present invention relates to a fuel control method and apparatus for a combined plant, and a program for allowing a computer to execute the fuel control method for the combined plant. More particularly, the present invention relates to a fuel control method for a combined plant that is not affected by the engagement or disengagement of a clutch, a control apparatus for use therein, and a program for allowing a computer to execute the fuel control method for the combined plant.

2) Description of the Related Art

A single-shaft combined plant is constructed by connecting a gas turbine, a power generator, and a steam turbine via a single shaft. In recent years, a single-shaft combined plant in which a clutch is disposed in a shaft between the power generator and the steam turbine has come on the market of the single-shaft combined plants. Such a single-shaft combined plant with a clutch is featured in that two rotors can be connected to or disconnected from each other via the clutch, and the gas turbine and the steam turbine can be started or stopped independently.

In such a single-shaft combined plant with a clutch, the clutch is disengaged until steam generated from an exhaust gas boiler that utilizes exhaust gas supplied from the gas turbine can be charged into the steam turbine, and, only the gas turbine and the power generator are first started in use. Then, once the steam turbine reaches a predetermined revolution number, the clutch is engaged. To the contrary, when the combined plant is stopped, the steam to be supplied to the steam turbine is first decreased, the clutch is disengaged, and thereafter, a fuel control valve is throttled, thereby stopping the gas turbine.

FIG. 8 is a diagram showing the configuration of a control system for the single-shaft combined plant with the clutch. First, the case such that a control system called a load limiting control system is adopted is explained. A gas turbine 81 and a steam turbine 82 are uni-axially connected to each other via a power generator 83 and a clutch 84. An output of the gas turbine 81 is controlled based on a control output 88 obtained by adding a value of a PID controller 87 to a difference E between a target load set value 85 from a host computer and an actual load 86.

The control output 88 is converted into a lift of a fuel control valve 89, and thereby a fuel flow rate is adjusted. Finally, the output of the gas turbine is controlled. The target load set value 85 from the host computer is appropriately reviewed according to the situation of power consumption. At this time, if the target load set value 85 is rapidly changed, the temperature around a burner and a blade of the gas turbine is changed, and as a result, the gas turbine is broken. In view of this, a change rate limiter 90 for suppressing a change rate is inserted immediately after the operation of the target load set value 85.

FIG. 9 is a diagram showing the configuration of another control system for the single-shaft combined plant with the clutch. This system is called a governor control system. In the case of output control of a gas turbine 91 in this system, a difference between a target load set value 92 from a host computer and an actual load 93 is first taken, and then, a revolution number command (SPSET) is produced accordingly, to be stored in a memory M. The output is controlled based on a control output 95 obtained by adding a gain K to a difference between the revolution number command value and an actual revolution number 94 of the gas turbine 91. Incidentally, a change rate limiter 96 is disposed immediately after the operation of the target load set value, which is the same as that of the load limiting control system.

When the single-shaft combined plant with the clutch such controlled as described above is adopted, torque required for the start is decreased since only the gas turbine and the power generator are first started in the state in which the clutch is disengaged. Consequently, it is possible to dispense with a starting device or reduce a capacity of the device. Furthermore, while only the gas turbine and the power generator are started, the steam turbine can be rotated at a low speed so as to ignore a windage loss. During this period of time, no cooling steam is needed. Consequently, it is possible to dispense with an auxiliary boiler or reduce a capacity of the boiler.

However, in the single-shaft combined plant with the clutch, there arise problems described below when the clutch is engaged and disengaged.

Since the torque of the steam turbine is applied to the power generator at a dash when the clutch is engaged, an output (i.e., an actual load) from the power generator is rapidly increased at a dash (the clutch cannot be engaged unless the torque of the steam turbine is applied at a dash). At this time, although the target load is constant in the combined plant control system, the actual load is rapidly increased, so that the fuel control valve is throttled at a dash. Such a fuel control abruptly changes the combustion state of the gas turbine, thereby leading to a danger of damage on a burner or a misfire.

To the contrary to the phenomenon, the torque of the steam turbine is eliminated at a dash when the clutch is disengaged, although it is necessary to disengage the clutch while the combined plant is stopped, and therefore, the output (i.e., the actual load) from the power generator rapidly drops in an instant at a dash. In other words, the clutch is successfully disengaged only when the valve is closed in such a manner that the torque of the steam turbine is reduced at a dash. At this time, since the target load is constant and the actual load rapidly drops, the fuel control valve is released at a dash. Such fuel control may also cause a damage given to the burner.

SUMMARY OF THE INVENTION

It is an object of this invention to provide a fuel control method and apparatus in a combined plant that are not affected by the engagement or disengagement of a clutch, and a program for allowing a computer to execute the fuel control method for a combined plant.

The fuel control method, according to one aspect of this invention, of controlling an increase or decrease of the fuel for the combined plant according to a difference between a target load set value input from a host computer and a value obtained by feeding back an actual load is applied in a combined plant that includes a gas turbine and a steam turbine connected to each other via a clutch. The fuel control method comprises steps of detecting an engagement period or a disengagement period of the clutch to output a period detected signal when either of the periods is detected, and switching the target load set value to the actual load during a fixed period before and after the engagement of the clutch and a fixed period before and after the disengagement of the clutch upon receipt of the detected signal as a trigger.

According to this invention, the engagement period of the clutch not only signifies the physical engagement time of the clutch but also includes a time immediately before the physical engagement time of the clutch at which the clutch is about to be engaged. Likewise, the disengagement period of the clutch includes a time immediately before the physical disengagement time of the clutch. The detection unit that detects the engagement period and the disengagement period of the clutch may be a position sensor additionally attached to the clutch or a sensor in synchronism with an electromagnetic clutch.

The fuel control method, according to another aspect of this invention, of controlling an increase or decrease of the fuel for the combined plant according to a difference between a target load set value input from a host computer and a value obtained by feeding back an actual load is applied in a combined plant that includes a gas turbine and a steam turbine connected to each other via a clutch. The fuel control method comprises steps of detecting an engagement period or a disengagement period of the clutch to output a period detected signal when either of the periods is detected, and substituting a predetermined constant value for the difference stored on a memory during a fixed period before and after the engagement of the clutch and a fixed period before and after the disengagement of the clutch upon receipt of the detected signal as a trigger.

The fuel control method, according to still another aspect of this invention, is applied in a combined plant that includes a gas turbine and a steam turbine connected to each other via a clutch. The method includes producing a revolution number command of the gas turbine according to a first difference between a target load set value input from a host computer and a value obtained by feeding back an actual load, and controlling an increase or decrease of the fuel for the combined plant according to a second difference obtained by comparing an actual revolution number of the gas turbine with the revolution number command. The fuel control method comprises steps of detecting an engagement period or a disengagement period of the clutch to output a period detected signal when either of the periods is detected, and substituting a predetermined constant value for the revolution number command stored on a memory during a fixed period before and after the engagement of the clutch and a fixed period before and after the disengagement of the clutch upon receipt of the detected signal as a trigger.

The program according to still another aspect of this invention allows a computer to execute any of the fuel control methods.

The fuel control apparatus according to still another aspect of this invention is applied in a combined plant that includes a gas turbine and a steam turbine connected to each other via a clutch. The fuel control apparatus controls an increase or decrease of the fuel for the combined plant according to a difference between a target load set value input from a host computer and a value obtained by feeding back an actual load. The fuel control apparatus comprises an input unit that receives input about a target load set value output from a host computer and an actual load, and a trigger unit that detects an engagement period and a disengagement period of the clutch to output a period detected signal when either of the periods is detected. The apparatus also comprises a calculation unit that, when receiving the detected signal, switches the target load set value to the actual load for a fixed period from the receipt of the detected signal or substitutes a predetermined constant value for the difference stored on a memory, and determines a control output for a fuel control valve by multiplying the difference being the constant value by a gain, and an output unit that outputs the control output to the fuel control valve.

The fuel control apparatus according to still another aspect of this invention is applied in a combined plant that includes a gas turbine and a steam turbine connected to each other via a clutch. The apparatus produces a revolution number command of the gas turbine according to a first difference between a target load set value input from a host computer and a value obtained by feeding back an actual load, and controls an increase or decrease of the fuel for the combined plant according to a second difference obtained by comparing an actual revolution number of the gas turbine with the revolution number command. The fuel control apparatus comprises an input unit that receives input about a target load set value from a host computer, an actual load, and an actual revolution number of the gas turbine, and a trigger unit that detects an engagement period and a disengagement period of the clutch to output a period detected signal. The apparatus also comprises a calculation unit that, when receiving the detected signal, substitutes a predetermined constant value for the revolution number command stored on a memory for a fixed period from the receipt of the detected signal, and determines a control output for a fuel control valve by multiplying the revolution number command being the constant value by a gain, and an output unit that outputs the control output to the fuel control valve.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2A and FIG. 2B are explanatory diagrams showing a control apparatus, in which FIG. 2A is a functional block diagram and FIG. 2B is a hardware configuration, FIG. 3 is a flowchart showing the flow of the control method for the first embodiment, FIG. 4 is a block diagram showing an example of elements required for detecting a clutch engagement or disengagement period, FIG. 9 is a diagram showing the configuration of another control system for the conventional combined plant with the clutch.

DETAILED DESCRIPTIONS

Embodiments of the present invention are explained in detail below with reference to the accompanying drawings. It is noted that the present invention is not limited to the embodiments. Furthermore, constituent elements in the embodiments include replaceable elements or elements easily handled by one skilled in the art, or substantially the same elements.

Figure 1:
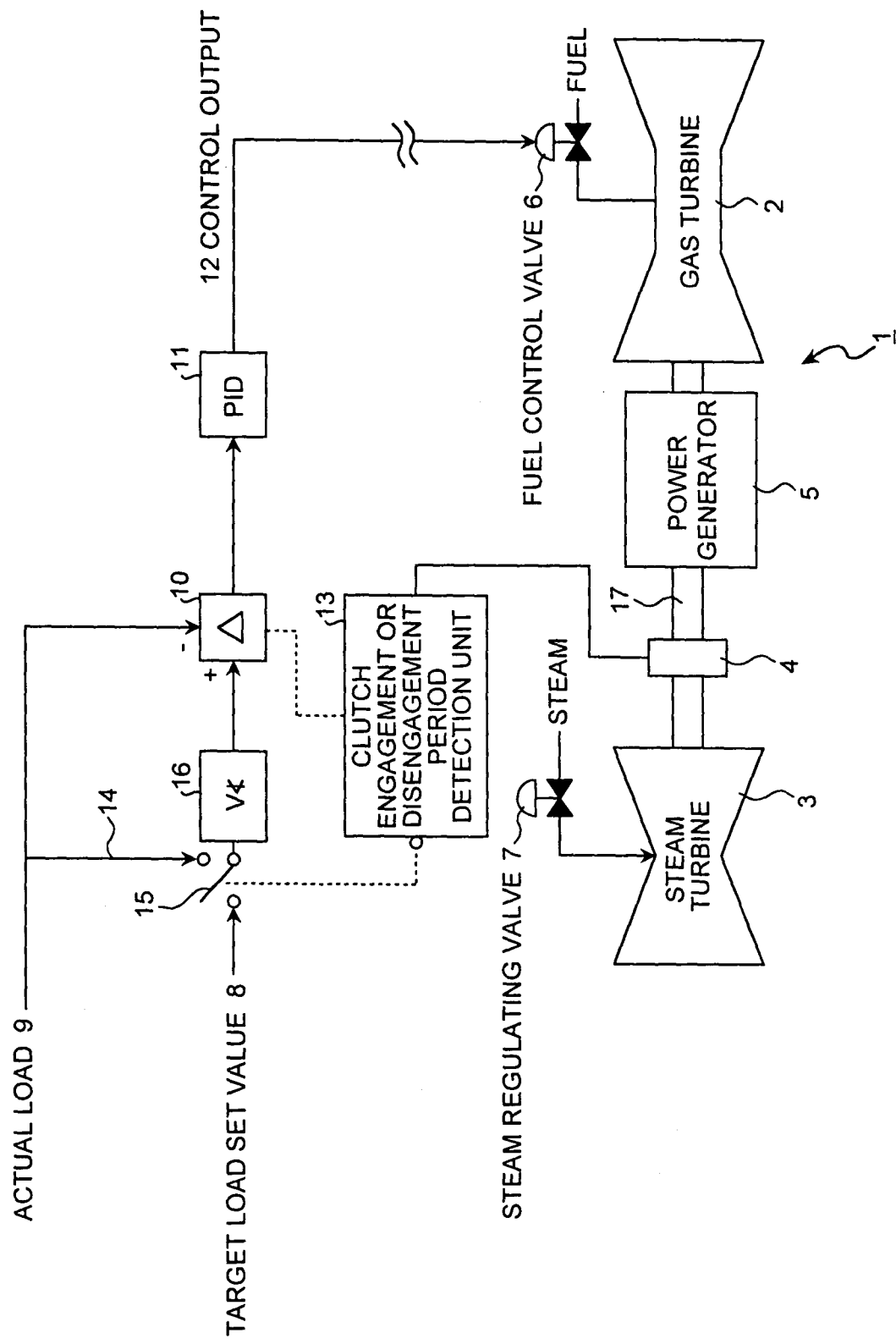
FIG. 1 is a block diagram showing a fuel control method for a combined plant according to a first embodiment of this invention.

A first embodiment of this invention will be explained below. FIG. 1 is a block diagram showing a fuel control method for a combined plant according to the first embodiment. In a combined plant 1, a gas turbine 2 and a steam turbine 3 are connected to each other via a clutch 4. Here, an example of a single-shaft combined plant in which a power generator 5 is disposed between the gas turbine 2 and the steam turbine 3 to be connected to one another via a single shaft, is explained.

Fuel in the combined plant 1 is fed to the gas turbine 2 via a fuel control valve 6 to rotate the turbine and then is exhausted. The exhausted gas generates pressurized steam in an exhaust gas boiler (not shown). The pressurized steam is fed to the steam turbine via a steam regulating valve 7 to rotate the turbine. In this manner, the power generator 5 constitutes a part of power generating equipment, and generates electric power by rotation of both the rotary machines, that is, the gas turbine 2 and the steam turbine 3.

The clutch 4 is disengaged when the combined plant 1 is started, and is engaged when the revolution number of the steam turbine 3 becomes equal to that of the gas turbine 2. In contrast, the steam regulating valve 7 is throttled during the stoppage of the combined plant 1 to reduce the revolution number of the steam turbine 3 at a dash, and thereby the clutch 4 is disengaged. Incidentally, the types of clutch 4 include a friction clutch, an interlock clutch, and the like, and among these clutches, the interlock clutch 4 such as a helical spline is preferable from the viewpoint of the magnitude of transmission power or reliability.

A control system comprises a subtractor 10, a PID controller 11, and a clutch engagement or disengagement period detection unit 13. The subtractor 10 performs subtraction between a target load set value 8 output from a host computer and a value 9 obtained by feeding back an actual load (hereinafter referred to as an actual load). A difference between the two values is determined to be then calculated by the PID controller 11 disposed downstream of the subtractor 10, and thus, a control output 12 is obtained. The control output 12 is converted into a lift of the fuel control valve 6 based on a function thereafter (or calculation, not shown), so that the fuel is controlled to be increased or decreased. Incidentally, it is general that a change rate limiter 16 is provided upstream of the subtractor 10, for suppressing an abrupt change in target load set value 8.

Immediately after the start of the combined plant 1 or during a rated operation, the clutch 4 is in a completely disengaged or engaged state, and thus, the fuel is controlled by the control method. In the meantime, when the clutch 4 is engaged and disengaged, the target load set value 8 is switched to the actual load 9 in response to a signal from the clutch engagement or disengagement period detection unit 13 as a trigger. That is to say, the signal from the target load set value 8 in FIG. 1 is switched to a signal 14 from the actual load 9.

The clutch engagement or disengagement period detection unit 13 for the clutch 4 may be any unit such as a position sensor additionally attached to the clutch 4 or a sensor in synchronism with an electromagnetic clutch. When the clutch 4 is engaged or disengaged depending on the revolution number or rotational speed of the steam turbine 3, for example, when a difference in speed between the gas turbine and the steam turbine becomes smaller than a predetermined value, this period is detected as the engagement period. When the steam regulating valve is throttled in a stop mode, this period is detected as the disengagement period. In these cases, the detection unit 13 may be a unit such as an encoder, a pulse generator, a tacho-generator, a resolver, or a solenoid valve.

Although the change rate limiter 16 is provided downstream of a switching selector 15 in FIG. 1 and these two constituent elements 15 and 16 are disposed independently from each other in order to explain the concept, the constituent elements 15 and 16 may be realized by single equipment or software. In this case, it is preferable that the function of the change rate limiter 16 should be turned off at the same time when the target load set value 8 is switched to the actual load 9.

In this manner, when the target load set value 8 output from the host computer is switched to the actual load 9, the difference in the subtractor 10 becomes zero. In other words, a sudden change in load generated at the time of the engagement or disengagement of the clutch can never influence on the control system downstream of the subtractor 10. Consequently, the fuel control valve 6 is not suddenly opened or throttled, unlike in the prior art, thereby preventing any damage on a burner of the gas turbine 2.

Figure 2A:
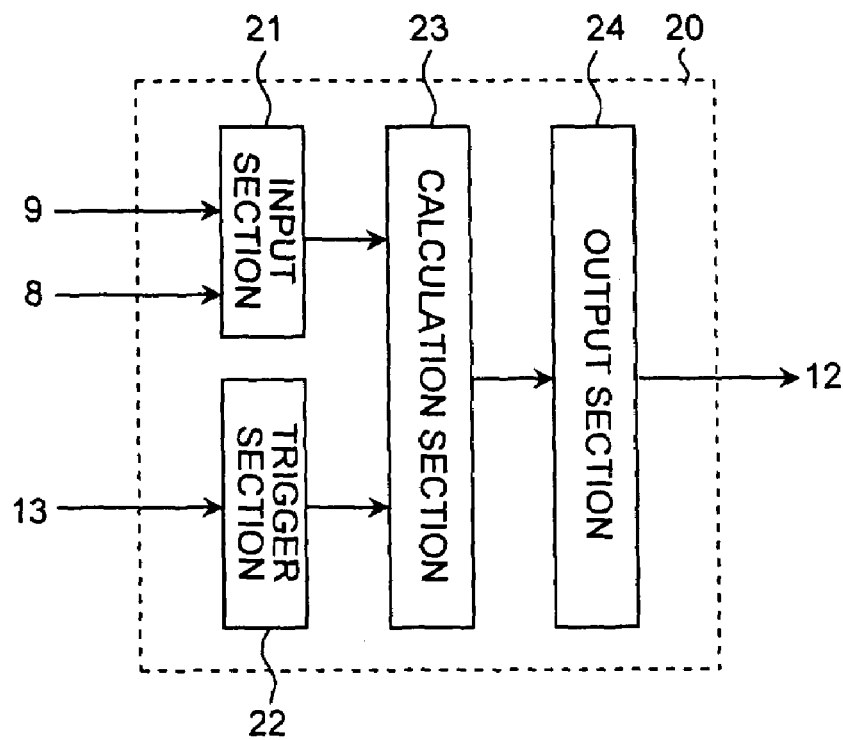
Figure 2B:
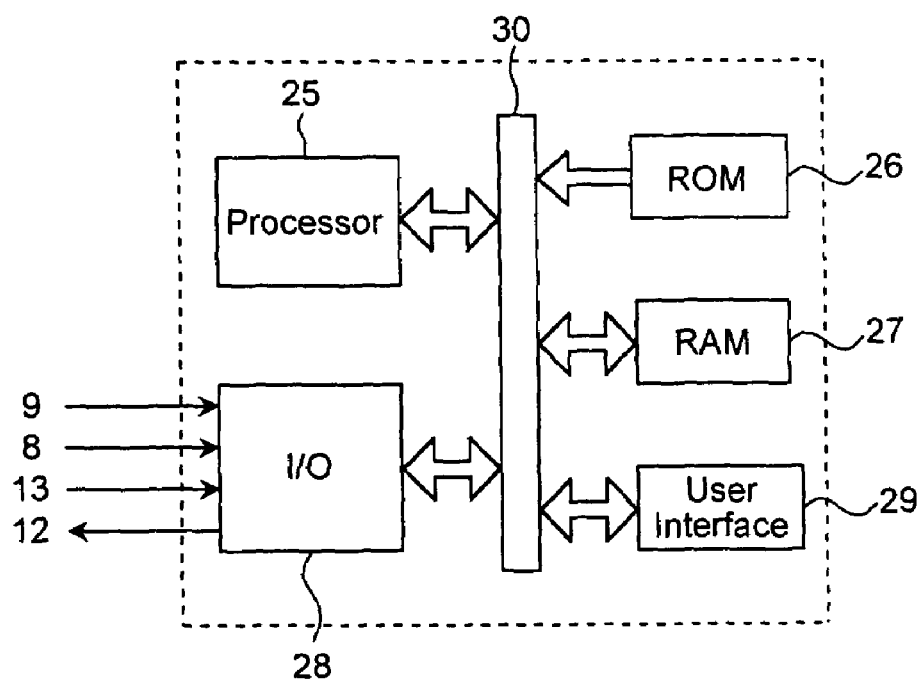

FIG. 2A and FIG. 2B are block diagrams showing a control apparatus that performs the control method, in which FIG. 2A is a functional block diagram and FIG. 2B is a block diagram showing a hardware configuration. As shown in FIG. 2A, a control apparatus 20 comprises an input section 21, a trigger section 22, a calculation section 23, and an output section 24. For the purpose of maintenance or monitoring, a user interface unit such as a monitor (not shown) may be provided in addition to the constituent elements.

The target load set value 8 and the actual load 9 are input into the input section 21. Furthermore, a trigger signal from the clutch engagement or disengagement period detection unit 13 is input into the trigger section 22. The calculation section 23 is adapted to perform the calculation in the change rate limiter 16, the subtractor 10, the PID controller 11, or the like based on the values input into the input section 21.

When the trigger section 22 detects the clutch engagement or disengagement period (i.e., the trigger signal), the calculation section 23 performs the switching. The output section 24 outputs the control output 12 led out by the calculation section 23 as an electric signal. Incidentally, the calculation section 23 includes a storage section therein, and thus, carries out the calculation by reading or writing data from or in the storage section.

As shown in FIG. 2B, the hardware configuration of the control apparatus 20 includes a processor 25 such as a CPU that is a complex instruction set computer (CISC) or a reduced instruction set computer (RISC) or a digital signal processor (DSP), a ROM 26, a RAM 27, an input-output interface (I/O) 28, and a user interface 29, each of which is connected to one another via a bus 30.

An execution program of the processor 25 is previously stored in the ROM 26. Furthermore, a communication program used to communicate with the input-output interface 28 and a program used to input or output data in or from the user interface 29 are also stored in the ROM 26. Although not shown in the figure, an A/D converter or a D/A converter is disposed in the input-output interface 28 according to a device to be connected thereto. The explanation is given based on the assumption that digital processing is performed by the software, but analog processing may be performed by hardware.

FIG. 3 is a flowchart showing the flow of the control method in the first embodiment. First, a target load set value and an actual load are input into the control apparatus (steps S101 and S201). Then, it is detected whether a trigger signal indicating the engagement or disengagement period of the clutch is input (step S103). If the trigger signal is input, a timer switches the target load set value to the actual load for a fixed period of time (i.e., a time until the engagement or disengagement state of the clutch is stabilized) (step S104). When the trigger signal is not input, the target load set value and the actual load are handled as respective values as they are.

A difference is obtained by subtracting the actual load from the target load set value (step S105). The PID controller calculates the obtained difference, thereby introducing it out as a control output (step S106). Thereafter, the control apparatus outputs the control output as an electric signal (step S107). The control apparatus repeats the routine of processing (step S108).

FIG. 4 is a block diagram showing an example of elements required for detecting the clutch engagement or disengagement period. First, an example of detection of the clutch engagement period is explained. There is a particular period such that the clutch engagement or disengagement period detection unit 13 receives a gas turbine revolution number 32 and a steam turbine revolution number 33, and that a difference between these revolution numbers becomes a fixed small value or less. The detection unit 13 judges this period as a period when the clutch is just about to be engaged, namely, judges that the clutch enters the engagement period, and outputs a trigger signal 34. The trigger signal 34 is designed to be output for a fixed period of time that has been previously set by a timer or the like. In this manner, the target load set value is switched to the actual load until a stabilization period such that the fluctuation in load after the clutch engagement is stabilized.

An example of detection of the clutch disengagement period is explained below. There is a particular period such that the clutch engagement or disengagement period detection unit 13 receives a signal 35 indicating a stop mode and a signal 36 from the steam regulating valve in the steam turbine, the clutch is in the stop mode, and that the steam regulating valve 36 is throttled. The detection unit 13 judges this period as a period when the clutch is just about to be disengaged, namely, judges that the clutch enters the disengagement period, and outputs the trigger signal 34. In this case, also, the trigger signal 34 is designed to be output for a fixed period of time that is previously set by the timer or the like. In this manner, the target load set value is switched to the actual load until a stabilization period when the fluctuation in load after the clutch disengagement is stabilized.

The flow is embodied in a computer program to be executed on a computer. In this way, it is possible to construct the control apparatus that performs the combined plant control method in which the target load set value is or is not switched to the actual load in response to the trigger signal.

A modification of the first embodiment will be explained below.

The same effect as that in the first embodiment can be produced also when the difference obtained in the subtractor 10 is set to a constant value in response to the trigger signal from the clutch engagement or disengagement period detection unit 13 shown in FIG. 1. In other words, the subtractor 10 can be constructed by the hardware or software, and in any case, there is provided the processing of temporarily storing the difference on the memory. When the clutch 4 enters the engagement period or the disengagement period, the difference is substituted by the predetermined constant value in response to the trigger signal from the clutch engagement or disengagement period detection unit 13.

Specifically, when the subtractor 10 is constructed by the hardware, a signal that subtracts or is subtracted may be set to zero by grounding, and in addition, may be set to a predetermined value by a bias circuit or the like. In contrast, when the subtractor 10 is constructed by the software, a value stored on the memory may be continued to be substituted during a given period of time after the output of the trigger signal from the clutch engagement or disengagement period detection unit 13. Here, the reason for the continuous substitute during the given period is that the actual load 9 from the power generator 5 or a connecting shaft 17 cannot be stabilized for the given period after the physical engagement or disengagement of the clutch. It is preferable to allow the given period to be appropriate set by a timer in the hardware or software.

Even by adopting such a control method, a sudden change in load occurring when the clutch is engaged or disengaged, can be prevented from exerting any influence on the control system downstream of the subtractor 10. Consequently, the fuel control valve 6 is prevented to be suddenly opened or throttled, unlike in the prior art, and thus, the burner of the gas turbine 2 cannot be damaged.

A second embodiment of this invention will be explained below.

Figure 5:
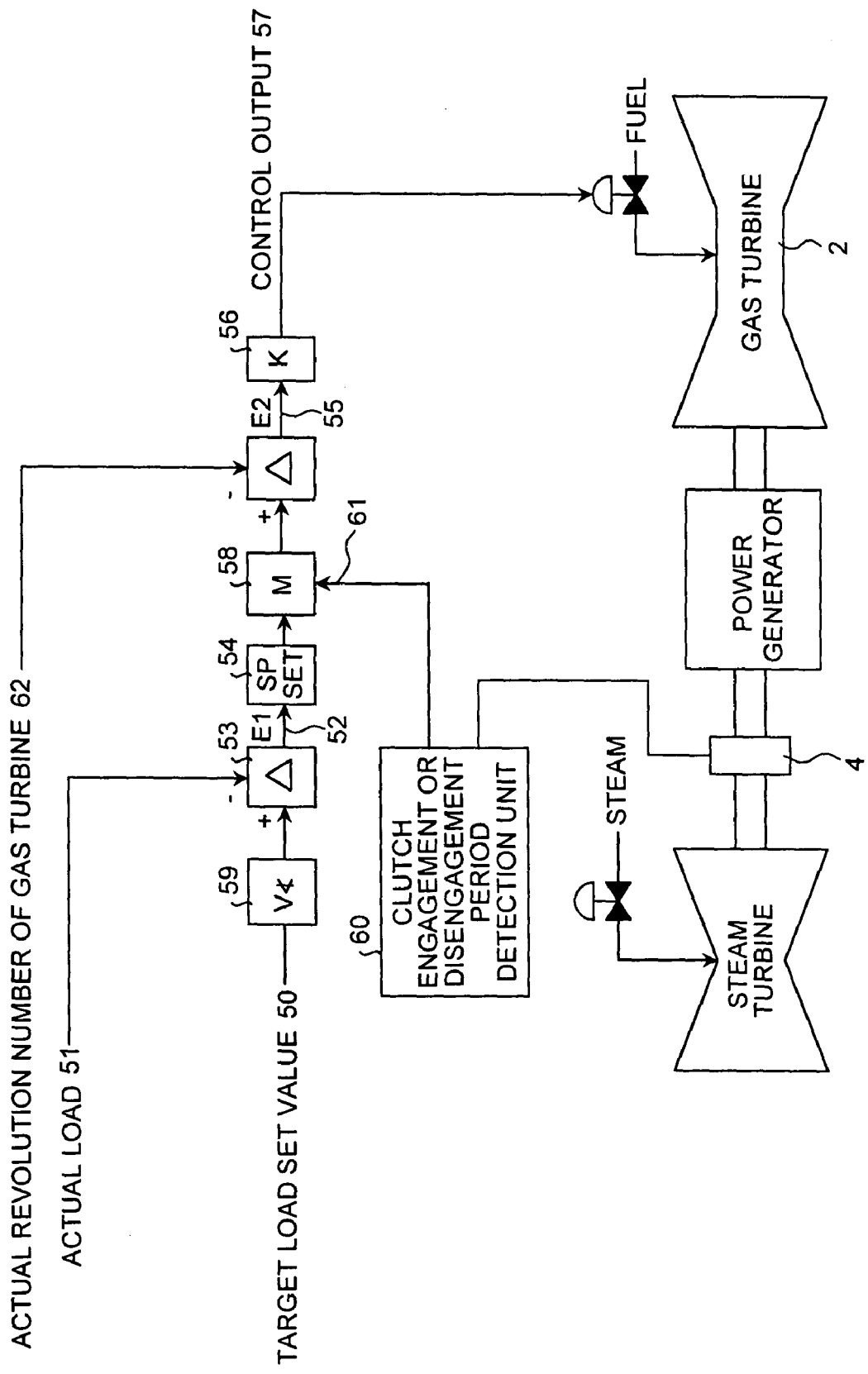
FIG. 5 is a block diagram showing a fuel control method for a combined plant according to a second embodiment of this invention.

FIG. 5 is a block diagram showing a fuel control method for a combined plant in a second embodiment of the present invention. FIG. 5 shows improvements made to the conventional governor mode. That is to say, a subtractor 53 obtains a difference E1 52 between a target load set value 50 and an actual load 51 from a host computer, thereby producing a revolution number command (SPSET) 54 accordingly.

A memory 58 temporarily stores the value of the command therein, and then, fuel control is performed based on a control output 57 obtained by giving a gain 56 to a difference E2 55 between a value fetched from the memory 58 and an actual revolution number 62 of the gas turbine. Here, the present embodiment is the same as the first embodiment in that a change rate limiter 59 is disposed downstream of the target load set value.

In the second embodiment, a description will be mainly given of a control method and a control apparatus in a configuration in which a clutch engagement or disengagement period detection unit 60 and a unit 61 that substitutes a value stored in the memory 58 with another value are disposed in addition to the configuration. The clutch engagement or disengagement period detection unit 60 may be a position sensor additionally attached to a clutch 4, a sensor such as an electromagnetic clutch, or a unit that receives a revolution number of a gas turbine or a steam turbine, a stop mode, or the switching state of a steam regulating valve, like in the first embodiment.

As described above, the SPSET 54 in the configuration is produced according to the difference E1 52. Consequently, when the actual load 51 is suddenly changed according to the engagement or disengagement of the clutch 4, the SPSET 54 is also suddenly changed. Therefore, according to the present invention, the value of the SPSET 54 is substituted by a predetermined constant value on the memory 58 in accordance with the engagement or disengagement of the clutch 4.

In this manner, no sudden change influences on a control system downstream of the difference E2 55 between the revolution number command 54 and the actual revolution number 62 of the gas turbine. Incidentally, when the SPSET 54 is produced, a change rate limiter may also be juxtaposed in order to suppress the sudden change. In this case, the same effect as that described above can be obtained even by substituting the change rate set by the change rate limiter with zero according to the engagement or disengagement of the clutch 4.

The apparatus for using the control method has basically the same configuration as that shown in FIG. 2A. Incidentally, the apparatus is different from that shown in FIG. 2A in that the actual revolution number 62 of the gas turbine is additionally input in the input section 21 in FIG. 2A, and therefore, three signals in total are input. The calculation to be performed by a calculation section 23 is also varied depending upon the difference in configuration shown in each of FIGS. 2 and 5. Next, the flow of control including the difference is specifically explained below.

Figure 6:
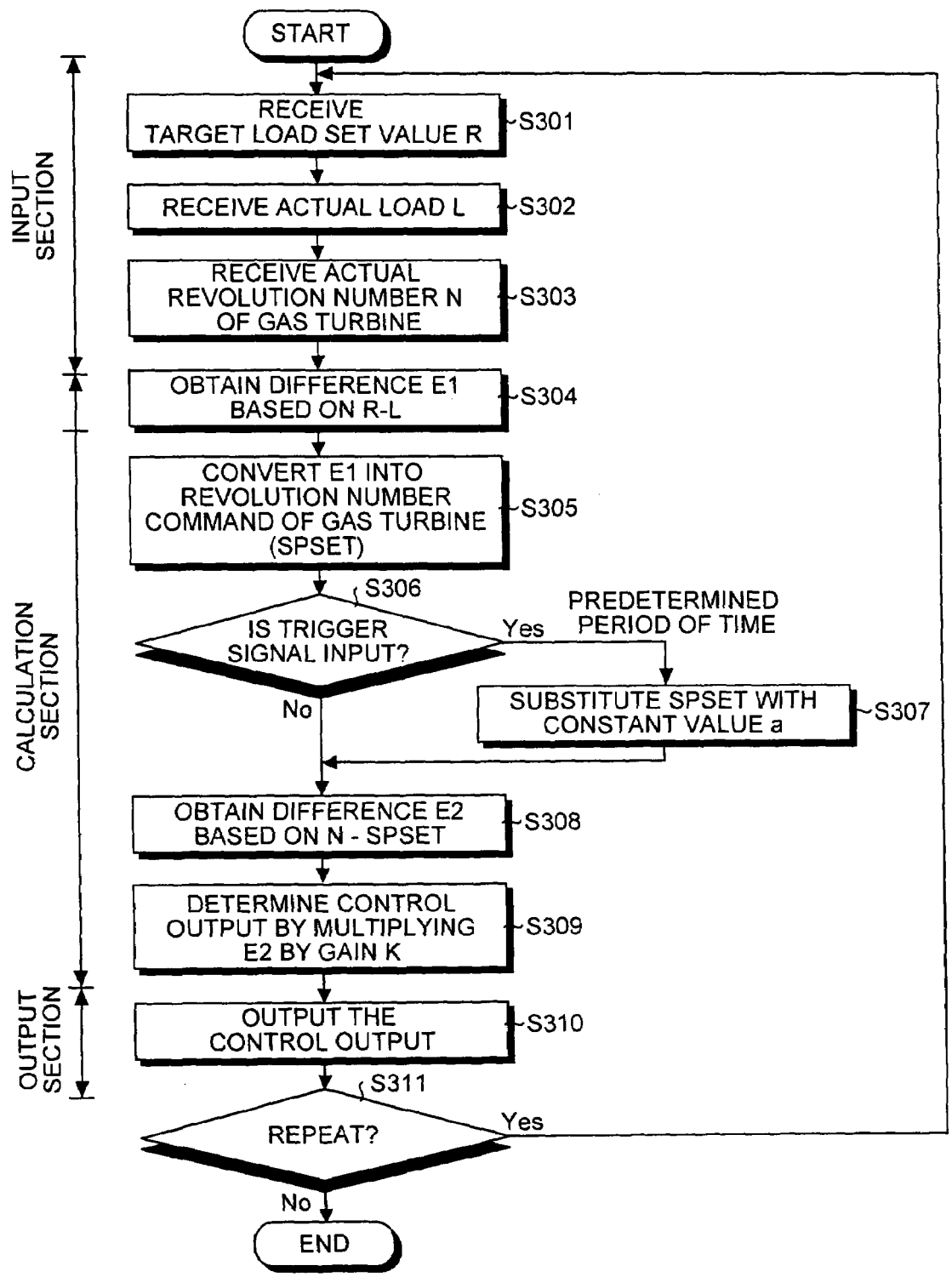
FIG. 6 is a flowchart showing the flow of the control method according to the second embodiment.

FIG. 6 is a flowchart showing the flow of the control method in the second embodiment. First, a target load set value R, an actual load L, and an actual revolution number N of the gas turbine (steps S301 to S303) are input into the control apparatus. Incidentally, although the actual revolution number N of the gas turbine is input at this point for the convenience in explanation, this number is not always input at this point, and therefore, it is also allowed that the number is input before the difference E2 as described later is obtained.

The load L is subtracted from R, thereby obtaining the difference E1 (step S304). The difference E1 is converted into the revolution number command (SPSET) of the gas turbine in consideration of an adjustment rate (step S305). Here, a change rate limiter may be additionally disposed as a compensator in order to suppress an abrupt change in the revolution number command. It is then confirmed that a trigger signal is input (step S306).

If the trigger signal is input, the value of the difference SPSET stored in the memory is substituted with a given value "a", or the change rate of the change rate limiter is set to zero (step S307). In contrast, if the trigger signal is not input, the value SPSET is held as it is. The SPSET is subtracted from the actual revolution number N of the gas turbine, thereby obtaining the difference E2 (step S308). The difference E2 is multiplied by a gain K, thereby generating a control output (step S309). Then, a final control output is output toward the fuel control valve (step S310). The control apparatus repeats the routine of processing (step S311).

The control prevents any change in the control output as long as the revolution number (the system frequency) of the power generator is not changed. When the load is stabilized with a brief lapse of time after the engagement or disengagement of the clutch, the SPSET is varied at a preset change rate, so that fuel is controlled in such a manner that the actual load follows the target load set value.

Figure 7:
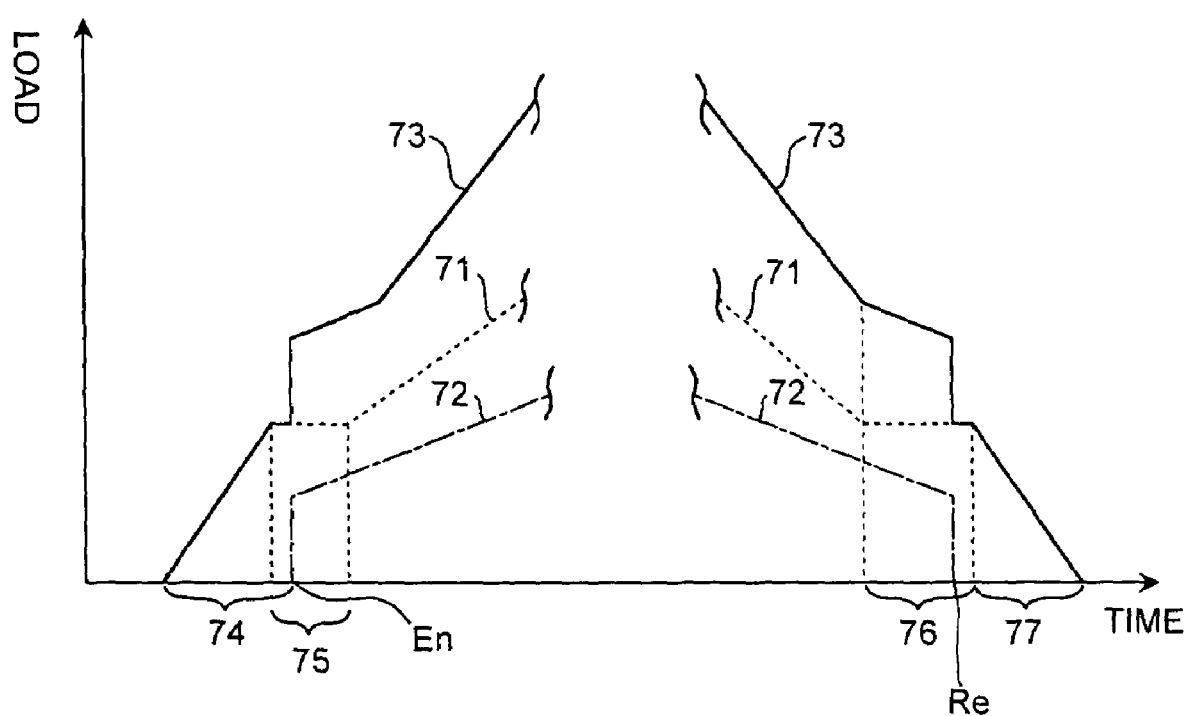
FIG. 7 is a graph showing a change in actual load in the combined plant.
Figure 8:
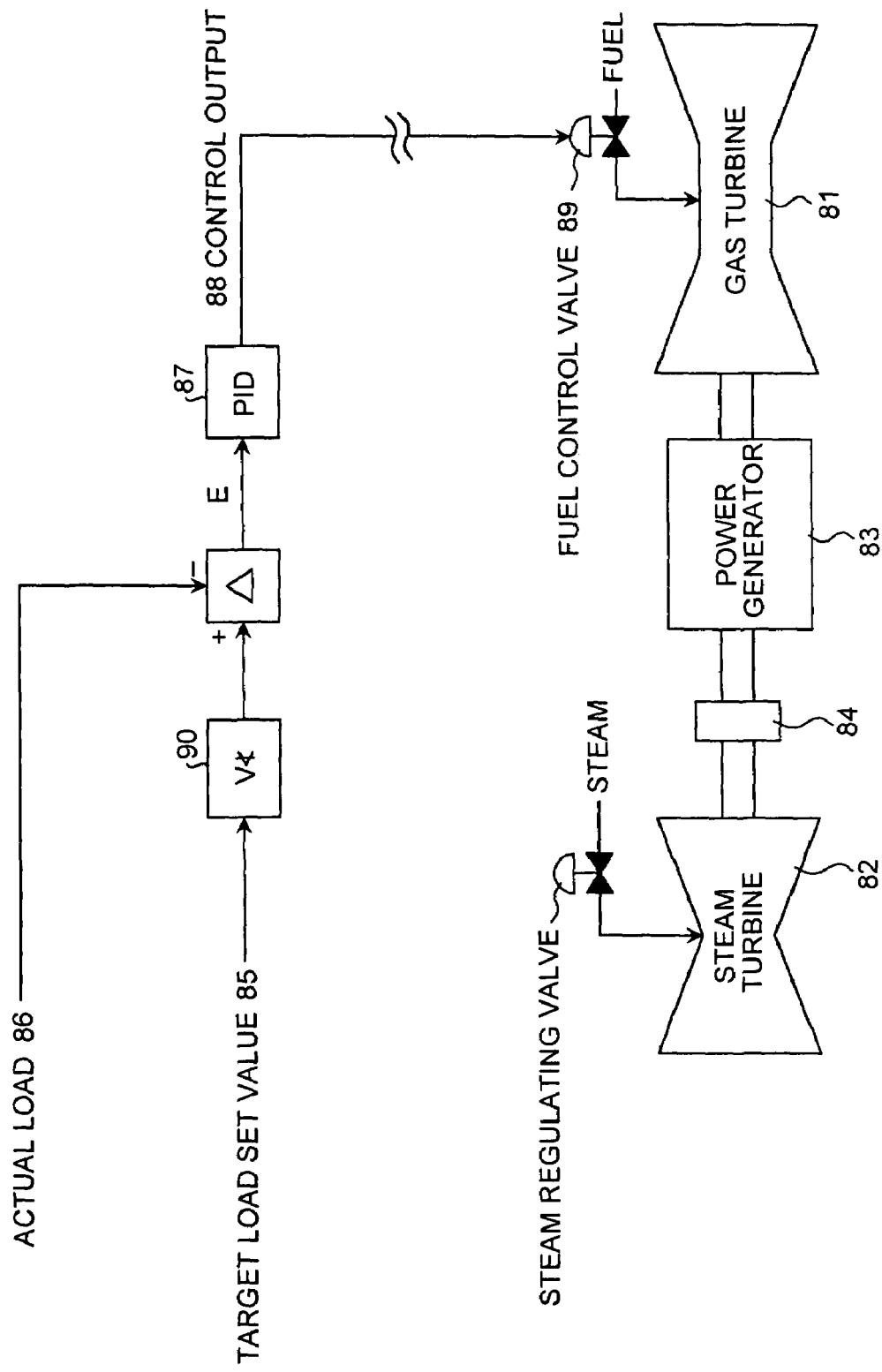
FIG. 8 is a block diagram showing the configuration of a control system for a conventional combined plant with a clutch.

FIG. 7 is a graph showing a change in actual load in the combined plant when the present invention is embodied. In the graph, the ordinate represents a load while the abscissa represents a time. In the graph, dotted lines indicate the load 71 of the gas turbine, long and short dashed lines indicate the load 72 of the steam turbine, and solid lines 73 indicate the sum of the two loads. As described above, only the gas turbine is first started when the combined plant is started. Therefore, the sum 73 in a time zone 74 is equal to the load of the gas turbine, and its inclination depends upon the setting by the change rate limiter.

At a time En when the revolution number of the steam turbine is increased and the clutch is engaged, the sum 73 becomes equal to the magnitude obtained by adding the load 71 of the gas turbine to the load 72 of the steam turbine, and it is abruptly changed. According to the present invention, since the difference takes a predetermined small value even at the time of the abrupt change, the fuel is not reduced excessively. Therefore, the fuel can be stably supplied without any impulsive outburst of the load.

Since the difference in a control algorithm becomes constant during the engagement period of the clutch, that is, during a zone 75 in a brief period before the engagement time En, the load 71 of the gas turbine is never changed, so that the sum 73 is moderately increased by an increase in load of the steam turbine 72. After the zone 75, the difference becomes equal to the difference between the target load set value and the actual load, so that the load is increased at a rate set by the change rate limiter.

In order to stop the combined plant, the stop mode is set (i.e., is selected by an operator), and then, the steam regulating valve to the steam turbine is throttled, whereby the load is abruptly decreased at the time Re of the disengagement of the clutch. In this case, also, the effect of the present invention can be exhibited, and thus, the fuel is never supplied impulsively. In other words, the difference becomes constant for a fixed period 76 from the disengagement time, and therefore, the load of the gas turbine is not changed but is kept at a constant value. The target load set value is decreased for a period 77 after the fixed period 76, so that the load is decreased at the rate set by the change rate limiter, thereby stopping the gas turbine. Incidentally, the same change in load can be obtained also by embodying the control method in the first embodiment.

As described above, according to the fuel control method for the combined plant as one aspect of the present invention, the sudden change in load occurring when the clutch is engaged or disengaged never influences on the control system disposed downstream thereof. Consequently, it is prevented to suddenly open or throttle the fuel control valve, unlike in the prior art, and thus, the burner of the gas turbine is never damaged.

According to the program as another aspect of the present invention, by executing the program on the computer, the fuel can be stably controlled in the combined plant irrespective of the sudden change in load at the time of the engagement or disengagement of the clutch. Thus, it is possible to prevent any breakage of the burner of the gas turbine.

According to the fuel control apparatus in the combined plant as still another aspect of the present invention, the fuel can be stably controlled in the combined plant irrespective of the sudden change in load at the time of the engagement or disengagement of the clutch. Thus, it is possible to prevent any breakage of the burner of the gas turbine.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A fuel control method for a combined plant that includes a gas turbine and a steam turbine connected to each other via a clutch, of controlling an increase or decrease of the fuel for the combined plant according to a difference between a target load set value input from a host computer and a value obtained by feeding back an actual load, the fuel control method comprising steps of:

detecting an engagement period or a disengagement period of the clutch to output a period detected signal when either of the periods is detected; and switching the target load set value to the actual load during a fixed period before and after the engagement of the clutch and a fixed period before and after the disengagement of the clutch upon receipt of the detected signal as a trigger.

2. A computer readable medium for storing a program for allowing a computer to execute a fuel control method for a combined plant that includes a gas turbine and a steam turbine connected to each other via a clutch, the method of controlling an increase or decrease of the fuel for the combined plant according to a difference between a target load set value input from a host computer and a value obtained by feeding back an actual load, the fuel control method comprising steps of:

detecting an engagement period or a disengagement period of the clutch to output a period detected signal when either of the periods is detected; and switching the target load set value to the actual load during a fixed period before and after the engagement of the clutch and a fixed period before and after the disengagement of the clutch upon receipt of the detected signal as a trigger.

* * * * *